US 6,178,430 B1

(12) United States Patent
Cohen et al.

(10) Patent No.: US 6,178,430 B1
(45) Date of Patent: Jan. 23, 2001

(54) AUTOMATED INFORMATION TECHNOLOGY STANDARDS MANAGEMENT SYSTEM

(75) Inventors: Edward L. Cohen, Highlands Ranch; Burt Crockett, Colorado Springs; Claude A. Godfrey, Colorado Springs; Ann O. Haehn, Colorado Springs; Mary F. Kubicek, Florrisant, all of CO (US); Anthony A. Main, Alice Springs (AU); Michael McIntyre; Mark D. Murtha, both of Colorado Springs, CO (US)

(73) Assignee: MCI Communication Corporation, Washington, DC (US)

( * ) Notice: Under 35 U.S.C. 154(b), the term of this patent shall be extended for 0 days.

(21) Appl. No.: 09/075,484

(22) Filed: May 11, 1998

(51) Int. Cl.[7] .................................................. G06F 15/00
(52) U.S. Cl. ........................................... 707/501; 707/513
(58) Field of Search .................................... 707/500–513, 707/516–526; 345/326–329, 302; 709/200–205, 102–106; 364/260, 254

(56) References Cited

U.S. PATENT DOCUMENTS 5,629,846 * 5/1997 Crapo ..................................... 708/705
5,634,051 * 5/1997 Thomson .................................. 707/5
5,862,325 * 1/1999 Reed et al. ............................ 709/201
5,966,451 * 10/1999 Utsumi .................................... 380/49
5,974,441 * 10/1999 Rogers et al. ........................ 709/200

* cited by examiner

Primary Examiner—Joseph H. Feild
Assistant Examiner—Alford W. Kindred

(57) ABSTRACT

An automated information technology standards management system for managing information standards that specify the procedures by which data is stored, manipulated, and retrieved within a computer system. The automated information technology standards management system manages information technology standards contained within a standards document stored on a permanent storage device. A download program converts the standards document into a displayable standards document that may be displayed on users' computers, and a dissemination process transmits the displayable standards document to users' computers for display. The automated information technology standards management system provides management services to users, including services for proposing changes to the information technology standards, for requesting changes to the information technology standards, scheduling on-line conferences for users to discuss proposed changes and requested exceptions to the information technology standards, and for voting on proposed changes and requested exceptions to the information technology standards.

4 Claims, 23 Drawing Sheets

*101* 1       Document and Billing Control System Standards
*102* 1.1          New Programs

*103* 
1.1.1          All new programs created for the Document and Billing Control System must be developed according to a four-phase development procedure. A general discussion of programming development procedures, given in the on-line discussion in http://www.progdev.com, provides background for the procedures. The phases include:
        (1)   Proposal and requirements solicitation
        (2)   Design and design review
        (3)   Implementation and implementation review
        (4)   Testing and testing review

*104*
1.1.1.1         Proposals     *108*
1.1.1.1.1       Proposals will be written according to the Brown, Stradford, & Pickens proposal standard as described in (http://www.bsp.com) and further described in Proposal Standards and Conventions #refer to section 3.4.6#. —*106*
1.1.1.1.2       A proposal will be submitted within 3 weeks of a Request for Proposal to the requesting authority.
1.1.1.1.3       Five printed copies of the proposal will be sent by internal office mail to the requesting authority and the proposal will be posted on the intranet, referenced from the main proposal page at (inet.proposals.dir) —*110*
1.1.1.1.4       Requirements will be solicited from all impacted division managers, from the Central Requirements Authority, and from relevant end-user section heads.
1.1.1.1.5   The proposal will include a preliminary cost analysis and estimated time of completion.

*105*
1.1.1.2         Program Design    *109*
1.1.1.2.1       Program design will be specified using the IDFCL design language and specification method, as described in: (http://idfcl.com) The design should be specified to the fourth IDFCL level, including complete data structure maps and verifiable control logic specification.
1.1.1.2.2       The final IDFCL design document will be submitted to the requesting authority within 5 weeks following submission of the proposal. The final IDFCL document must be machine verified and template tested, with supporting output and control logic state search maps appended in a single appendix at the end of the proposal.
1.1.1.2.3       Proposals will be reviewed by the Review Proposal Board, according to the Procedures and Protocols of the Review Board #refer to section 2.3.3.5#.

*107*

Prior Art

FIG. 1

Index for Document and Billing Control System Standards $405\begin{cases}1 & \text{Document and Billing Control System Standards} \quad 401 \\ 1.1 & \text{New Programs} \quad 402 \\ 1.1.1.1 & \text{Proposals} \quad 403 \\ 1.1.1.2 & \text{Program Design} \quad 404\end{cases}$ Document and Billing Control System Standards 406— 1     Document and Billing Control System Standards
407— 1.1     New Programs
410— Print
411— Request Exception
412— Request Standard Change
413— View Requested Exceptions
414— View Requested Standards Changes 1.1.1     All new programs created for the Document and Billing Control System must be developed according to a four-phase development procedure. A general disscussion of programming development procedures, given in the on-line disscussion in http://www.progdev.com, provides background for the procedures. The phases include:
        (1)     Proposal and requirements solicitation
        (2)     Design and design review
        (3)     Implementation and implementation review
        (4)     Testing and testing review 408— 1.1.1.1     Proposals
Print
Request Exception
Request Standard Change
View Requested Exceptions
View Requested Standards Changes
    1.1.1.1.1     Proposals will be written according to the Brown, Stradford, & Pickens proposal standard as described in http://www.bsp.com and further described in Proposal Standards and Conventions. ⟵415
    1.1.1.1.2     A proposal will be submitted within 3 weeks of a Request for Proposal to the requesting authority.
    1.1.1.1.3     Five printed copies of the proposal will be sent by internal office mail to the requesting authority and the proposal will be posted on the intranet, referenced from the main proposal page at inet.proposals.dir.
    1.1.1.1.4     Requirements will be solicited from all impacted division managers, from the Central Requirements Authority, and from relevant end-user section heads.
    1.1.1.1.5     The proposal will include a preliminary cost analysis and estimated time of completion.

FIG. 4A

*409*— 1.1.1.2    Program Design
Print
Request Exception
Request Standard Change
View Requested Exceptions
View Requested Standards Changes
1.1.1.2.1             Program design will be specified using the IDFCL design language and specification method, as described in: http://idfcl.com. The design should be specified to the fourth IDFCL level, including complete data structure maps and verifiable control logic specification.
1.1.1.2.2             The final IDFCL design document will be submitted to the requesting authority within 5 weeks following submission of the proposal. The final IDFCL document must be machine verified and template tested, with supporting output and control logic state search maps appended in a single appendix at the end of the proposal.
1.1.1.2.3             Proposals will be reviewed by the Review Proposal Board, according to the Procedures and Protocols of the Review Board.

FIG. 4B

Standards

| Standard 501 | Group Name 502 | Description 503 | JCL Error 504 | ER Time 505 | SCR Time 506 |
|---|---|---|---|---|---|
| 1 | programdev | program development standards | | 7 days | 14 days |
| 2 | tapearch | tape dataset archiving standards | | 1 day | 3 days |
| 3 | datasetal | dataset allocation standards | 3621 | 4 days | 8 days |
| 4 | resourceal | resource allocation standards | 3999 | 2 day | 7 days |

507

Users

| User ID /601 | First Name /602 | Last Name /603 | email /604 | phone /605 | password /606 |
|---|---|---|---|---|---|
| 1 | Jerry | Brown | jerry@dsn.com | 441-9600 | hey you |
| 2 | Alice | Jones | aliceJ@dsn.com | 442-8750 | fluffy |
| 3 | Tanya | Zhukova | tz@dsn.com | 441-1918 | vanya |
| 4 | Ivan | Krassovskii | vanya@dsn.com | 448-3621 | tanya |

Owners

| Standard (701) | Owner UID (702) |
|---|---|
| 1 | 4 |
| 2 | 891 |
| 3 | 331 |
| 4 | 847 |
| 19 | 21 |

Committees

| Group Name (801) | User ID (802) |
|---|---|
| programdev | 1 |
| programdev | 8 |
| programdev | 3 |
| programdev | 36 |
| tapearch | 13 |

Change Requests

| Request ID ,901 | Request Type ,902 | Date ,903 | Submitter ID ,904 | Standard ,905 | Close Date ,906 | Status ,907 | Additional Columns ,908 → |
|---|---|---|---|---|---|---|---|
| 1 | SCR | 12/1/97 | 835 | 1 | 12/15/97 | 0 | |
| 361 | ER | 12/1/97 | 964 | 3 | 12/5/97 | 0 | |
| | | | | | | | |
| | | | | | | | |

FIG. 9

Conferences

| Conference ID ,1001 | Start ,1002 | Duration ,1003 | Topic ,1004 | Comments ,1005 | Admin Comments ,1006 | Status ,1007 |
|---|---|---|---|---|---|---|
| 1 | 12/13/97 1:30pm | 2 hours | 1 | could be exciting | | |
| | | | | | | |
| | | | | | | |
| | | | | | | |

FIG. 10

Conference Attendees

| Conference ID /1101 | User ID /1102 |
|---|---|
| 1 | 4 |
| 1 | 8 |
| 1 | 3 |
| 1 | 36 |
| 1 | 22 |

Votes

| Request ID /1201 | User ID /1202 | Vote /1203 | Comments /1204 |
|---|---|---|---|
|  |  |  |  |
|  |  |  |  |
|  |  |  |  |
|  |  |  |  |
|  |  |  |  |

FIG. 12

Errors

| JCL Error /1301 | User ID /1302 |
|---|---|
| 3999 | 76 |
| 3621 | 888 |
|  |  |
|  |  |
|  |  |

FIG. 13

|          |                                             |     |
|----------|---------------------------------------------|-----|
| ↓1501    | ↓1502                                       | ↓1503 |
| 1        | Document and Billing Control System Standards | 3   |
| 1.1      | New Programs                                | 4   |
| 1.1.1.1  | Proposals                                   | 19  |
| 1.1.1.2  | Program Design                              | 38  |

FIG. 15

AUTOMATED INFORMATION TECHNOLOGY STANDARDS MANAGEMENT SYSTEM

TECHNICAL FIELD

This invention relates generally to a computer-based system for managing information technology standards and, in particular, to a system for Downloading mainframe-based information technology standards to a Web Server and exporting the Downloaded information technology standards to PC-based users via an intranet.

BACKGROUND OF THE INVENTION

The information assets of large organizations have traditionally been stored and managed on centralized computer systems. These centralized computer systems contain both raw information, such as accounting information, inventory information, and employee records, along with a suite of programs, including database management systems, that store, process, and retrieve the information assets. A large number of different hardware resources and software programs are used for managing the information assets, or data. For example, critical data must be backed up on multiply redundant, nonvolatile storage media. To manage this backup task, an archiving system is generally run at regular time intervals to write out the data in a meaningful format to tapes or magnetic disks. As another example, database management systems may be employed to store, meaningfully categorize, and manipulate data within the computer system.

There are a great number of different alternatives and possibilities for managing the data for an organization. An organization may, for example, elect to make incremental tape backups of critical data on a monthly, daily, or even hourly basis, depending on the cost of the incremental backups versus the potential risks and associated costs of loosing cumulative data. As another example, database management systems support a virtually infinite number of ways to organize data within a computer system. An organization must therefore select a set of operating procedures and standards for defining the particular methods by which the organization has chosen to manage data within a computer system The procedures and standards that control the management of computer data are generally stored in a large text-based document hierarchically organized into a number of levels of sections and subsections. FIG. 1 displays the first page of an example standards document. The example standards document of FIG. 1 contains standards for a document and billing control system, as indicated by the title of the document on the first line 101. Standards documents usually comprise many tens to hundreds of pages of text. In the example standards document of FIG. 1, the section heading 102 for section 1.1 indicates that section 1.1 relates to standards for developing new programs. A general description 103 follows the section heading 102. After the general description are more specific subsections on topics introduced in the general description, including a section on standards for proposals 104 and a section on standards for program design 105.

The text of a standards document may contain references to other sections within the document. Such references are indicated by a specific notation, for example, bracketing with "#" symbols 106 and 107 in the example standards document of FIG. 1. This type of reference is called an internal reference. The standards document may also contain references to various external sources of information. For example, the example standards document of FIG. 1 contains references to several commercial web pages 108 and 109 as well as a reference to a file available on the intranet. This type of reference is called an external reference. In addition to conforming to notational conventions for external and internal references 110, standards documents are written to conform to formatting conventions, including a numbering scheme for numbering sections, an indentation convention, and other conventions that specify the visual appearance of the standards document.

The standards document must itself be managed in some regular and intelligent fashion so that the standards document is made available to computer users and program developers and so that the standards document can be updated to reflect necessary changes and additions. The procedures and mechanisms for managing and disseminating the standards document is called an information technology standards management system ("ITSMS").

FIG. 2 displays a traditional manual ITSMS comprising a centralized computer system 201, an administrator's station 202, and computer user's stations 203. The standards document resides in a standards dataset stored on a nonvolatile storage device within the centralized computer system 204. This standards dataset, or portions thereof, is transmitted via 3270 terminal emulation and a subnetwork access protocol (SNA) link to the administrator's terminal 205 where it is displayed in an editable format. The administrator manually manages the standards document using keyboard input and terminal display. Information contained in the standards document, or portions thereof, is disseminated by the administrator to the various computer users and program developers via a separate e-mail system 206, printed documents 207, or by telephone 208. The administrator collects proposed changes and conducts discussions about the standards with computer users and program developers in a relatively ad hoc fashion using e-mail, printed documents, telephone conversations, and personal interviews and meetings. Various computer users and program developers may be designated as the owners of particular standards and may additionally be organized into a number of different committees that are responsible for discussing proposed changes and voting on them. The results of committee actions are returned to the standards administrator who then edits the displayed standards via keyboard entry to the terminal and causes the updated standards to be propagated back to the standards dataset stored on the centralized computer system.

The manual ITSMS displayed in FIG. 2 is inefficient and error prone. For example, the standards administrator may neglect to inform committee members of proposed standards changes or forget to poll committee members for their votes. Dissemination of the standards document via printed listings or e-mail incurs significant time delays since the standards administrator must manually extract, print, and disseminate portions of the standards document. The scheduling and transmission times related to in-person or telephone information exchanges is quite high. A need has therefore been recognized within the information technology departments of large organizations to automate ITSMS systems.

SUMMARY OF THE INVENTION

The present invention provides an automated information technology standards management system that manages information standards specifying procedures by which data is stored, manipulated, and retrieved within a computer system. The information standards are included in standards document, traditionally stored in a text-based, flat-file format in a large, centralized computer system. The present invention downloads the standards document to a network server and connects the standards document into a HTML document. The HTML document is then available for display by web browsers on user computers connected to the network. The present invention additionally provides to users various management services that allow users to request changes to the standards document and to request exceptions, or variances, from the standards in order to perform specific tasks in a way that would be otherwise precluded by the standards. Users may schedule networked conferences for discussing proposed changes and exceptions and may vote on proposed changes and exceptions by using management services provided by the present invention.

The automated information technology standards management system replaces manual information technology standards management systems that rely on relatively ad hoc procedures carried out by human administrators to carry out the dissemination and management of the information technology standards. The automated information technology standards management system is more efficient, less errorprone, and more easily scaleable to large organizations than the manual information technology standards management systems that it replaces.

BRIEF DESCRIPTION OF THE DRAWINGS

FIG. 1 displays an example conventional standards document.

FIGS. 4A and 4B display a HTML standards document prepared by a download program.

FIG. 6 displays the Users table.

FIG. 7 displays the Owners table.

FIG. 8 displays the Committees table.

FIG. 9 displays the Change Requests table.

FIG. 10 displays the Conferences table.

FIG. 11 displays the Conference Attendees table.

FIG. 12 displays the Votes table.

FIG. 13 displays the Errors table.

FIG. 15 displays a temporary index prepared by the program Download.

DETAILED DESCRIPTION OF THE INVENTION

An illustrative embodiment of the present invention provides an automated ITSMS for managing the procedures and standards used to store, process and retrieve computer data by information technology departments of large organizations. The standards are embodied in a text-based document stored in a standards dataset on a centralized computer system. The standards document is downloaded and transmitted via an intranet to a network server. The network server in turn transmits portions of the standards document formatted into web pages over the intranet to computer users and program developers. The automated ITSMS manages a local database on the network server that the automated ITSMS uses to store information about the users, about the standards, and about requests for exceptions to the standards and for changes to the standards. The automated ITSMS provides a conferencing facility that may be used by users to discuss requests for changes and exceptions to the standards. The automated ITSMS can upload information from the local standards database, transmit the uploaded information back to the centralized computer system over the intranet, and incorporate changes or additions to the standards into the standards dataset on the centralized computer system. Thus, the automated ITSMS provides intranet access to the standards document as well as a number of services that may be used by users of the automated ITSMS to manage information technology standards.

Figure 3:
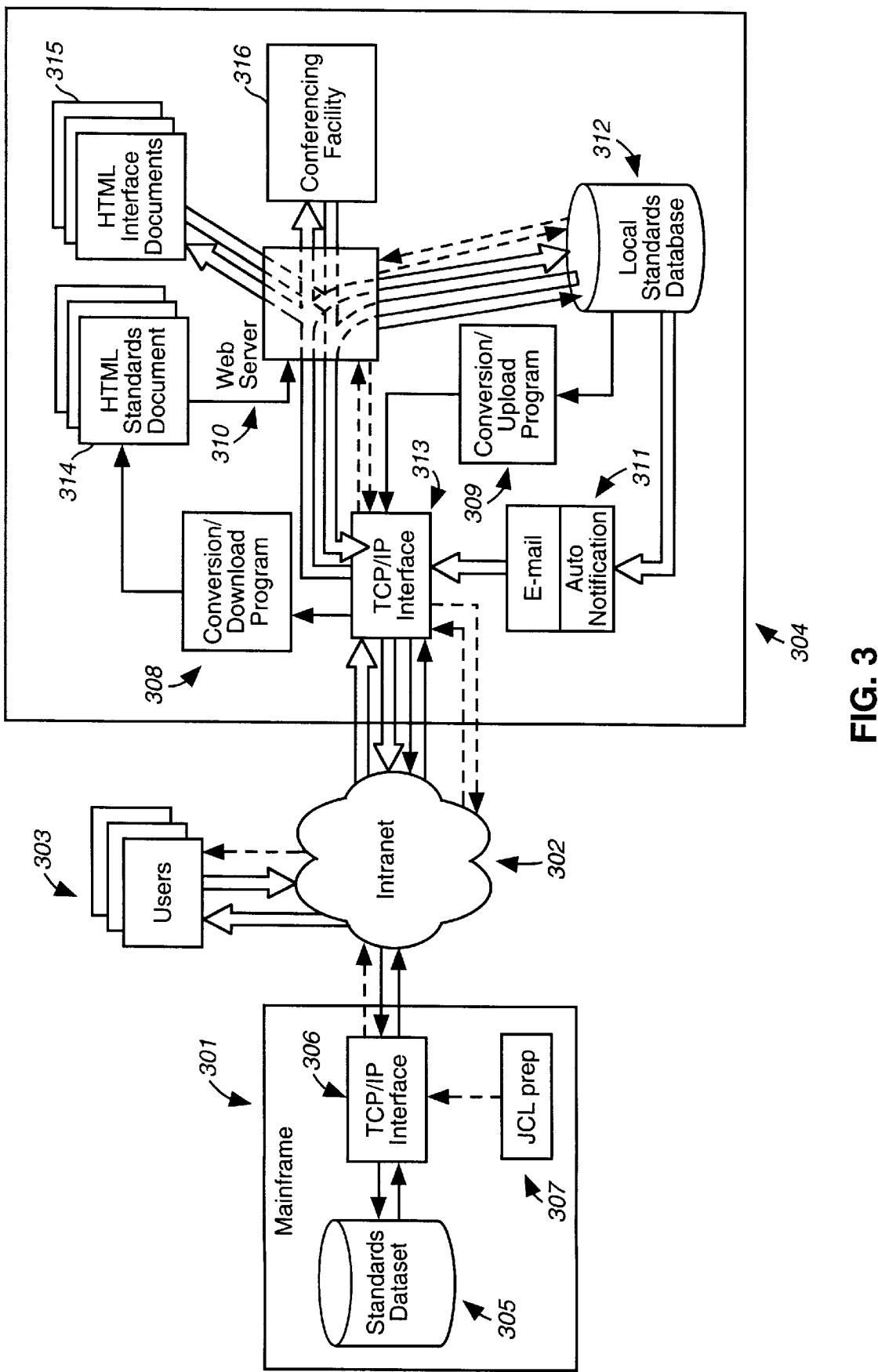
FIG. 3 displays a schematic representation of the various components of an automated ITSMS in an illustrative embodiment of the present invention.

FIG. 3 displays a schematic representation of the various components of the automated ITSMS, to be discussed in detail in following paragraphs. The automated ITSMS comprises a centralized computer system 301, a corporate intranet 302, a number of users 303, and a network server 304. The centralized computer system includes a standards dataset stored on nonvolatile storage 305, a TCP/IP interface 306, and a Job Control Language prep routine ("JCL prep routine") 307. The network server 304 includes a Download program 308, an Upload program 309, a Web Server process 310, an Auto-Notification process 311, a local standards database 312, and a TCP/IP interface 313. The network server also includes a hyper text markup language ("HTML") standards document 314 that corresponds to the standards document stored in the standards dataset on the centralized computer system, various HTML interface documents 315, and a conferencing facility 316.

The HTML documents are commonly displayed on graphics terminals by web browser programs. Web browsers enable the hypertext links within HTML documents so that a user can navigate through the pages of the document using simple mouse clicks. The HTML documents encapsulate a rather high-level description of the appearance and contents of a text document which is translated into lower-level graphics commands native to a particular computer by the web browser running on that computer.

Figure 2:
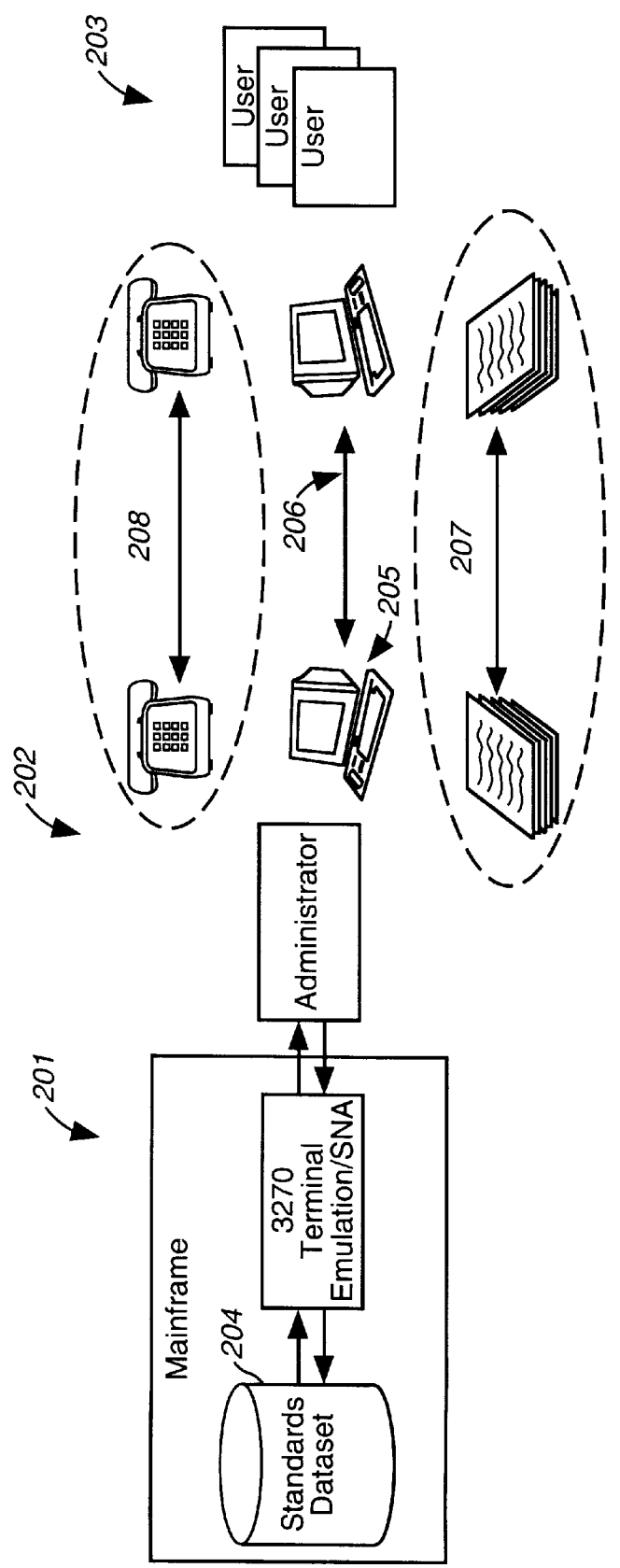
FIG. 2 displays a conventional manual ITSMS.

The standards dataset 305 is the basic repository for the information technology standards in the automated ITSMS, as it is in the manual ITSMS shown in FIG. 2. In the automated ITSMS of FIG. 3, the standards dataset is downloaded through the TCP/IP interface on the centralized computer system 306, the intranet 302, and through the network server's TCP/IP interface 313 by the Download program 308 that runs on the network server. The Download program then converts the data stored in the flat file format of the standards dataset into a HTML document.

The HTML standards document created by the Download program is displayed to users 303 by the Web Server process 310 running on the network server. The Web Server process also extracts information from the HTML standards document and stores it in the local standards database 312. The Web Server process 310 maintains an additional set of HTML interface documents 315 which it displays to users in the course of providing a variety of management services for managing the information technology standards.

The Web Server process stores change requests, conference scheduling requests, and updates to the standards document in the local standards database 312. Updates are regularly uploaded by the Upload program 309, which converts the information into a flat file dataset format and incorporates the information via the intranet into the standards dataset 305 residing on the centralized computer system.

The Auto-Notification program 311 monitors the contents of the local standards database 312 and notifies users of events that require their attention by sending e-mail messages to the users over the intranet. For example, a particular set of users may be required to vote on a proposed standards change. The Auto-Notification program detects the proposed standards change in the local standards database and sends e-mail to each of the users required to vote on the proposed standards change in order to notify the users of the need to vote on the proposed standards change. The Auto-Notification process informs the user who requested a standards change of the results of a vote on the proposed standards change, informs users of pending conferences that they are required to attend, and conducts a number of similar activities that disseminate information to users of the automated ITSMS.

When a program is run on the centralized computer system, an error condition may arise causing a JCL error message to be generated. The JCL error messages are often related to violation of a particular standard. The JCL prep process 307 running on the centralized computer system fields these JCL error messages and transmits them via the intranet and Web Server process to the local standards database 312. When the Auto-Notification program 311 detects newly generated JCL error messages in the local standards database, the Auto-Notification program notifies the user who ran the program of the error and of the particular standard, if any, that was violated. If a standard was violated, the user may then request a change to the standards or request an exception to the standards so that the program may be successfully run. The automated ITSMS of FIG. 3 thus provides a wealth of management services to users of the automated ITSMS that, in the manual ITSMS displayed in FIG. 2, would require many inefficient manual steps to be carried out by an administrator.

FIGS. 4A and 4B display the HTML standards document as it appears to a user viewing the document through a web browser. The HTML standards document of FIGS. 4A and 4B is the result of preparation by the Download program 308 in FIG. 3 using, as input, the text document displayed in FIG. 1. A comparison of the HTML document displayed in FIGS. 4A and 4B with the text document of FIG. 1 demonstrates the nature of the transformation effected by the Download program. One feature of the HTML standards document is that underlined words and phrases indicate hyperlinks. For example, the underlined headings 401–404 of FIG. 4A represent hyperlinks from the index of the HTML standards document 405 to specific sections within the body of the standards document 406 through 409, respectively. Thus, a user may examine the index, navigate the cursor to a particular heading using a mouse, click on the heading using a mouse button, and immediately bring up the section of the body of the document that corresponds to the topic or heading selected by the mouse operations from the index. The external references in the text document of FIG. 1, as, for example, the first external reference to the Brown, Stradford & Pickens proposal standard 108, have been transformed into hyperlinks in the HTML standards document of FIGS. 4A–4B. The Brown, Stradford & Pickens reference 415 in the HTML standards document is an active hyperlink that allows quick, mouse-based navigation to the referenced document.

Another feature of the HTML standards document that is not found in the text document displayed in FIG. 1 is the set of hyperlinks following each major section heading, like, for example, hyperlinks 410–414. By clicking these hyperlinks, a user may navigate to various HTML interface forms provided by the Web Server process to initiate a number of different information technology standards management services. For example, by clicking on hyperlink 411, a user may navigate to an HTML interface document that allows a user to request an exception to the new program standards 407 of section 1.1. A program developer, given the task of quickly implementing a utility program without the necessary time for all four phases of software development, promulgated in section 1.1 of the HTML standards document, could request an exception to the new program standards for that particular project. Thus, the basic features of the HTML standards document created by the download program include an index of hyperlinks to sections within the HTML standards document, resolution of external and internal references into hyperlinks, and hyperlinks to HTML interface documents for management services. The HTML interface document is easily transmitted by the Web Server process to users' computers and is easily viewed and manipulated by those users using a common web browser.

The automated ITSMS uses the local standards database 312 in FIG. 3 to store information needed for providing management services to users and for storing updates to the standards document that eventually migrate on a regular basis back to the standards dataset on the centralized computer system. There are many different possible ways to store such information. FIGS. 5–13 illustrate a number of relational database tables that together comprise one possible implementation of the local standards database.

Figure 5:
FIG. 5 displays the Standards table.

FIG. 5 displays the Standards table. This table is created as a result of the download process to concisely describe the various standards that together comprise the information technology standards document. As with all relational database tables, the Standards table comprises a fixed number of columns, each column essentially representing a field within a data record, and a variable number of rows, each row essentially representing a separate data record. The column "Standard" 501 includes a unique identifier for each different standard. The column "Group Name" 502 includes the name of the group, or committee, of users that is responsible for maintaining the standard. The column "Description" 503 includes a description of the standard. Note that only a very short description is shown in this column for each row displayed in FIG. 5. However, as a practical manner, this description would most likely be rather lengthy, perhaps even repeating significant portions of the text from the information technology standards document. The column "JCL Error" 504 includes a unique identifier of the JCL error that is generated when the standard is violated during program execution on the centralized computer system. Note that in the case of the program development standards, this column does not contain a value because, in general, program development is not itself an executable program that can generate a JCL error. The column "ER Time" 505 includes the time period within which an exception request to the standard must be fulfilled or denied. The column "SCR Time" 506 includes the time period during which a standards change request directed to the standard must be either fulfilled or denied.

Each row in the Standards table describes a separate standard. For example, row 507 describes the standard with unique identifier "1" maintained by the committee "programdev." This standard is related to program development standards, with exception requests required to be resolved within seven days and standards change requests to be resolved within fourteen days.

FIG. 6 displays the Users table. This table includes information about each user of the automated ITSMS. The column "User ID" 601 includes a unique identifier for the user. The column "First Name" 602 includes the user's first name and the column "Last Name" 603 includes the user's last name. The user's e-mail address, phone number and system password are contained in columns 604 through 606, respectively. Each row of the Users table represents a different user of the automated ITSMS. For example, row 607 represents a data record describing user "Jerry Brown" having user ID "1," e-mail address "Jerry@dsm.com", phone number "441-9600," and the password "hey you." The Users table is created and maintained by the Web Server process running on the network server.

FIG. 7 displays the Owners table. This simple table includes a one-to-one relationship between the standards described in the Standards table and the Users described in the Users table. Each standard has a single owner. Column 701 includes the unique identifier for a particular standard and column 702 includes the unique user ID for the owner of that standard. Thus, for example, row 703 represents the fact that the standard identified by the unique identifier "1" is owned by the user identified by the unique identifier "4."

FIG. 8 displays the Committees table. The Committees table includes relationships between groups, or committees, and individual users. In essence, the Committees table defines committees. The column "Group Name" 801 includes the name of the committee and the column "User ID" 802 includes a user ID of a member of the committee identified in column 801. Thus, each row of the Committees table indicates membership of a particular user in a particular committee. For example, the example data in rows 803–806 of the Committees table in FIG. 8 define the "programdev" group to be comprised of users "1," "8," "3," and "36."

FIG. 9 displays the Change Requests table. The Change Requests table includes one row for every pending standards change request and exception request entered by the Web Server process. The column "Request ID" 901 includes a unique identifier for a request. The column "Request Type" 902 includes the type of the request, the types being either "SCR," indicating a standards change request, or "ER," indicating an exception request. The column "Date" 903 includes the date on which the request was submitted. The column "Submitter ID" 904 includes the unique user ID of the user that submitted the request. The column "Standard" 905 includes the unique identifier of the standard for which the change or exception has been requested. The column "Close Date" 906 includes the date by which the request must be either denied or fulfilled. The column "Status" 907 indicates the status of the request. The status of a request may include various states, for example, the state of being open, the state of being in committee, the state of having been denied, or the state of having been accepted as proposed. Additional columns, starting with column 908, may include further descriptive information about the request, including comments, a cost benefit analysis, justification, expense estimates, expected results, and other such information. The Change Requests table is used by the Auto-Notification process to keep users informed of their obligations to consider change and exception requests.

FIG. 10 displays the Conferences table. The Conferences table includes records describing each conference scheduled by the automated ITSMS. The column "Conference ID" 1001 includes a unique identifier for the conference. The column "Start" 1002 includes the date and time at which the conference is to occur. The column "Duration" 1003 includes an indication of the proposed length of the conference. The column "Topic" 1004 includes a unique request identifier taken from column 901 of the Change Requests table that indicates the topic of the conference. The topic might be a proposed standards change request or an exception request. The column "Comments" 1005 includes comments made by the conference scheduler and the column "Admin Comments" 1006 includes comments entered by an administrator who reviews scheduled conferences. The column "Status" 1007 includes an indication of the status of the conference, used by the Auto-Notification process to determine when to send e-mail to conference attendees to inform them of an upcoming conference. The Conferences table may include additional information concerning the topic or nature of each conference in additional columns following column 1007.

FIG. 11 displays the Conference Attendees table. The Conference Attendees table lists the users that are required to attend each scheduled conference. The column "Conference ID" 1101 includes a unique conference identifier taken from column 1001 of the Conferences table and the column "User ID" 1102 includes a unique user identifier taken from column 601 of the Users table. Thus, there is a separate row in the Conference Attendees table for each attendee of each conference. The example rows shown in FIG. 11 represent the fact that users "4," "8," "3," "36," and "22" are required to attend conference "1." Referring to the Conferences table displayed in FIG. 10, it is apparent that users "4," "8," "3," "36," and "22" should be available on Dec. 13, 1997, at 1:30 p.m., for two hours, to discuss the proposed standards change request to the standard having the unique standard ID "1."

FIG. 12 displays the Votes table. The Votes table includes individual votes entered by committee members in response to a proposed standards change request or a proposed exception request. The column "Request ID" 1201 includes a unique request identifier taken from column 901 of the Change Requests table. The column "User ID" 1202 includes the user ID of the user who entered the vote, taken from column 601 of the Users table. Column 1203 includes the vote itself, either "Y" for yes or "N" for no. The column "Comments" 1204 includes additional comments that the voter may desire to make along with the vote.

FIG. 13 displays the Errors table. This Errors table includes a report of each JCL error that arises during execution of programs on the centralized computer system, along with an indication of the user who submitted the program for execution. The column "JCL Error" 1301 includes a JCL error identification number and the column "User ID" 1302 includes the user ID of the user whose submitted program generated the error. The Errors table is used by the Auto-Notification process running on the network server to notify users of errors that have been generated because of programs that they submitted and to notify the users of the corresponding standards that were violated. Such notification allows the users to then make a standards change request or an exception request to overcome the problem.

With the local standards database defined and described in the above discussion, the implementation details of the Download program, the Auto-Notification process and the Web Server process may be described below. In this discussion, flow control diagrams displayed in FIG. 14 and in FIGS. 16–26 will be referenced.

Figure 14:
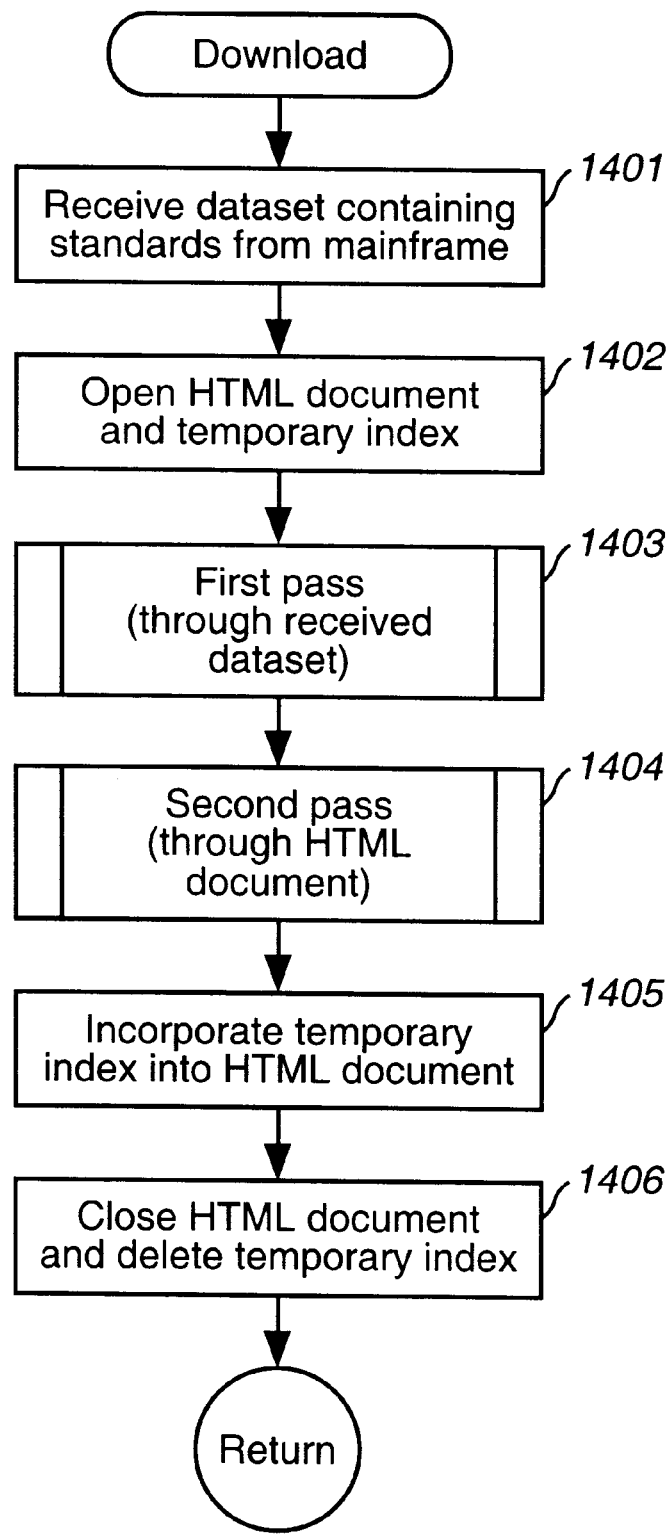
FIG. 14 displays a high level flow control diagram for the program Download.

FIG. 14 displays a high level flow control diagram for the Download program that transforms a standards text document stored in a flat file format within a standards dataset on a centralized computer system into an HTML standards document that is displayed to users by web browsers running on the user's computers. In step 1401, Download receives a text-based standards document, for example, the Document displayed in FIG. 1. In step 1402, Download opens a new HTML document and a temporary index which Download will later combine together to form the final HTML standards document. In step 1403, Download makes a first pass through the received text-based standards document, creating the temporary index for the HTML standards document and the new HTML standards document by retrieving lines from the text-based standards document, placing them into the new HTML standards document, and placing references to section headings in the temporary index. During this process, Download marks internal and references that will later be resolved into hyperlinks. In step 1404, Download makes a Second Pass, this time through the new HTML standards document created during the first pass through the text-based document in step 1403. In step 1404, Download resolves all internal references and creates hyperlinks within the HTML standards document to replace the internal references. In addition, Download creates hyperlinks to various management services which Download inserts into the HTML document following major section headings, as described above and as illustrated in FIGS. 4A and 4B. In step 1405, Download incorporates the temporary index prepared during step 1403 into the final HTML standards document, resolving section heading/line number pairs within the temporary index into hyperlinks. Finally, in step 1406, Download closes the newly prepared HTML standards document and deletes the temporary index, after which Download returns.

FIG. 15 displays a temporary index prepared by the Download program during conversion of the portion of the text-based standards document displayed in FIG. 1 into the HTML standards document displayed in FIGS. 4A and 4B. The temporary index includes the major section numbers in column 1501, the text of the major headings in column 1502, and a line number within the final HTML standards document at which the heading occurs 1503. Download uses the line numbers in the temporary index in order to resolve the section headings into internal hyperlinks in the final HTML standards document.

Figure 16:
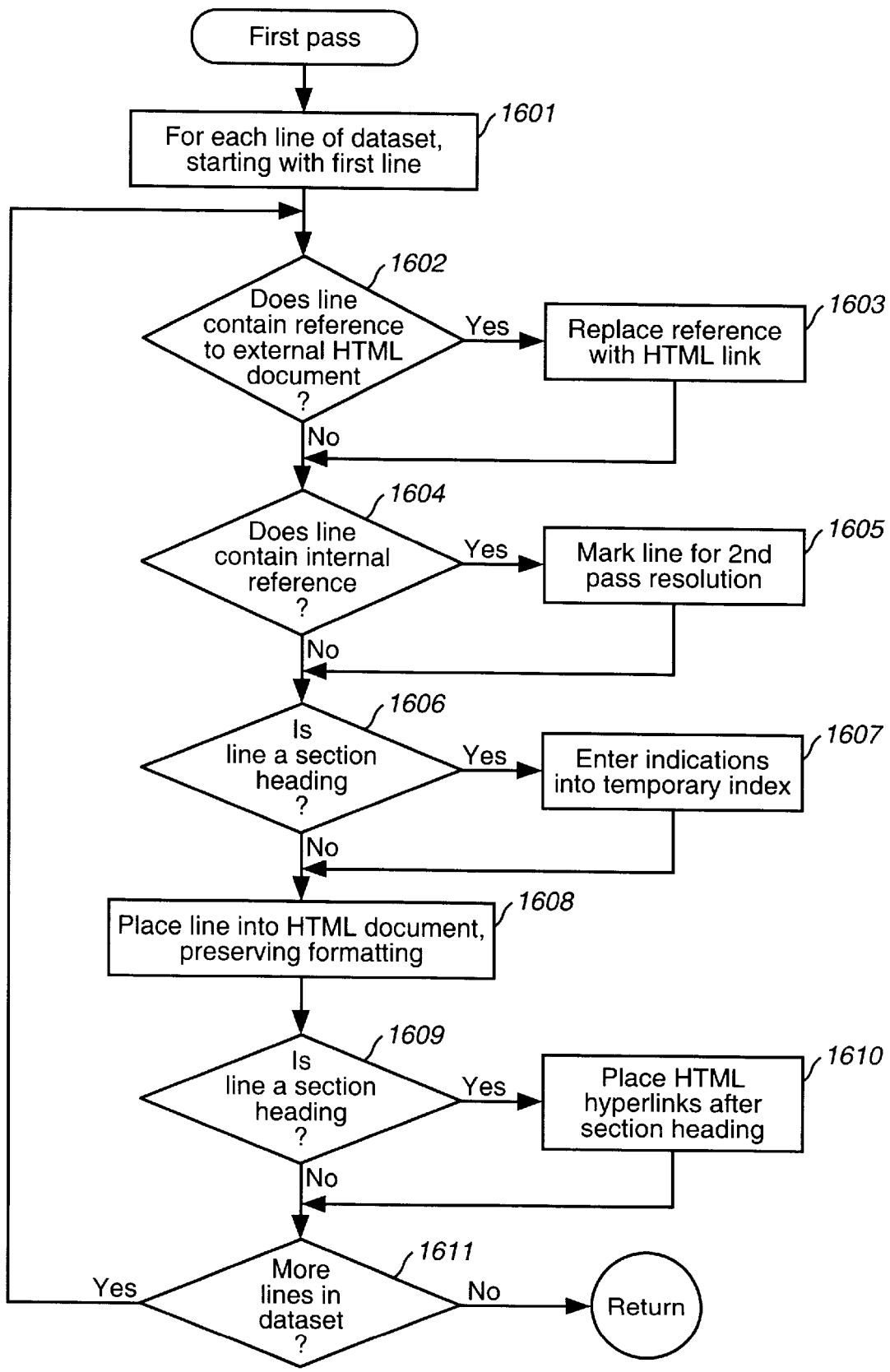
FIG. 16 displays a flow control diagram for the subroutine First Pass.

FIG. 16 displays a flow control diagram of the subroutine "First Pass" that is called in step 1403 of FIG. 14. In step 1601, First Pass loops through each line of the received text-based standards document, starting with the first line. This loop includes steps 1602–1611. In step 1602, First Pass determines whether a selected line includes a reference to an external HTML document. If it does, then, in step 1603, First Pass replaces the text-based reference in the line with an HTML link. In step 1604, First Pass determines whether the line includes an internal reference. If it does, then, in step 1605, First Pass marks the line so that the internal reference will be resolved using the temporary index during the Second Pass of step 1404 in FIG. 14. In step 1606, First Pass determines whether the selected line is a section heading. If it is, then, in step 1607, First Pass enters the section heading into the temporary index. In step 1608, First Pass places the selected line into the HTML standards document, preserving in the HTML standards document the formatting and appearance of the text-based line. In step 1609, First Pass determines, again, whether the selected line is a section heading. If the selected line is a section heading, then, in step 1610, First Pass places HTML hyperlinks after the section heading in the HTML standard document that allow a user to link to the various management services provided by the Web Server process, as described above and as illustrated in FIGS. 4A–4B. In step 1611, First Pass determines whether there are more lines in the received text-based document and, if so, continues processing the next line of the received text-based document in step 1602. If, on the other hand, there are no more lines, then First Pass returns.

Figure 17:
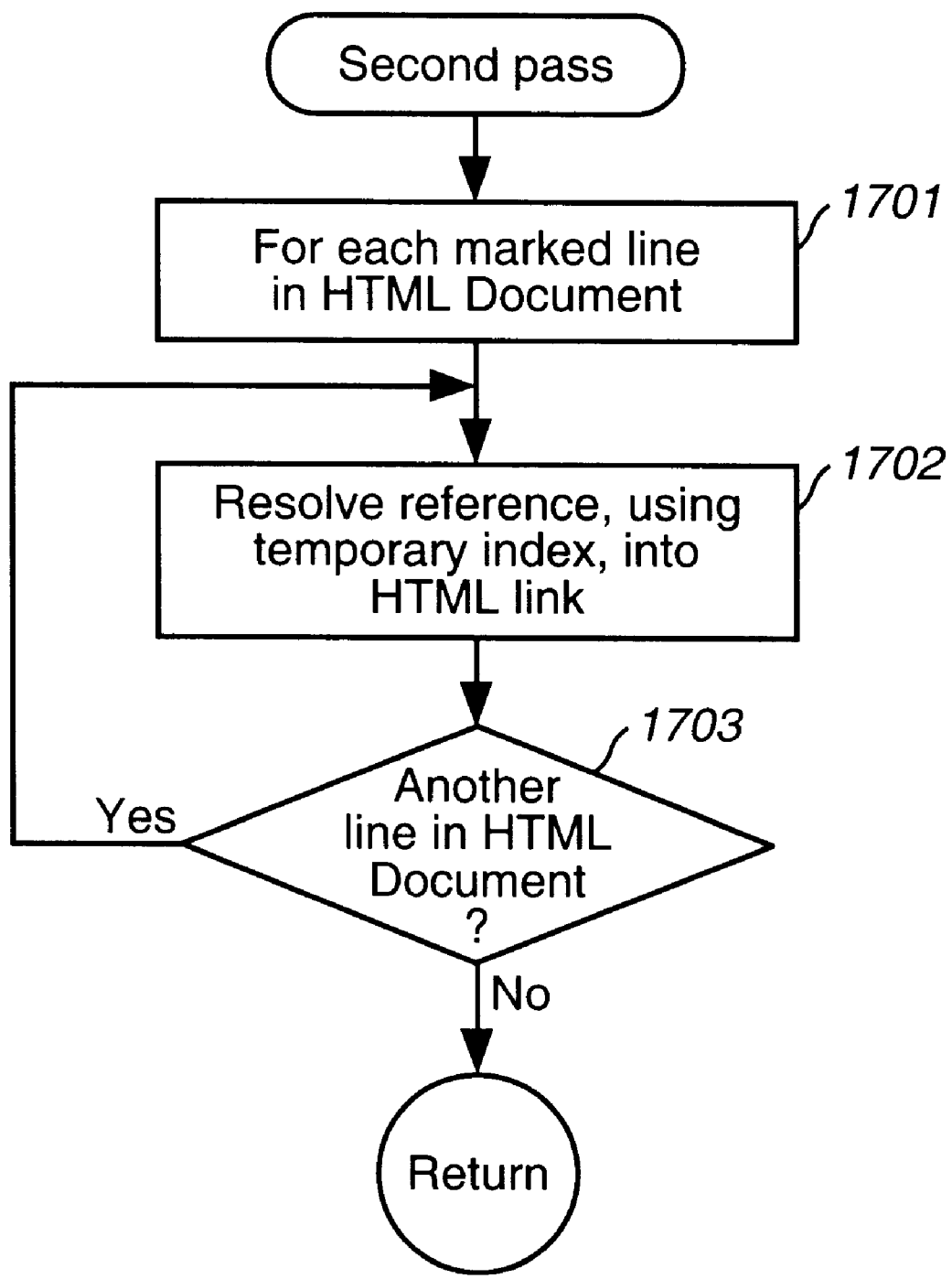
FIG. 17 displays a flow control diagram of the subroutine "Second Pass" called in step 1404 of FIG. 14.

FIG. 17 displays a flow control diagram of the subroutine "Second Pass" called in step 1404 of FIG. 14. In step 1701, Second Pass examines each line in the HTML standards document that was marked by First Pass to indicate that the line contains an internal reference. For each such line, Second Pass, in step 1702, consults the temporary index in order to resolve the internal reference and changes the internal reference into a hyperlink to the appropriate line of the HTML standards document. In step 1703, Second Pass determines whether there are additional marked lines within the HTML standards document. If so, control returns to step 1702. Otherwise, Second Pass returns.

Thus, the Download program transforms a text-based standards document, an example of which is shown in FIG. 1, into an easily displayed and manipulated HTML standards document, as shown in FIGS. 4A and 4B. Download prepares an index into the text-based document which it appends to the final HTML standards document, transforms all internal references within the standards document into hyperlinks to other portions of the HTML standards document, and transforms all external references into hyperlinks to external HTML documents. In addition, Download inserts hyperlinks to management services provided by the Web Server process following each major section heading. The final HTML standards document produced by Download may be displayed on any computer that is linked through the intranet to the Web Server process and that has a web browser or similar software for displaying HTML documents. This allows for information technology standards to be automatically disseminated from the standards dataset on the centralized computer system to users, automatically at the users' request, without intervention of a human administrator.

As discussed above, the Auto-Notification process is responsible for informing users about various events that require their attention. The Auto-Notification process accomplishes this by monitoring the local standards database and extracting from the local standards database pending and upcoming events. The Auto-Notification process then uses an e-mail facility via the intranet to send to users e-mail messages containing information about the upcoming and pending events.

Figure 18:
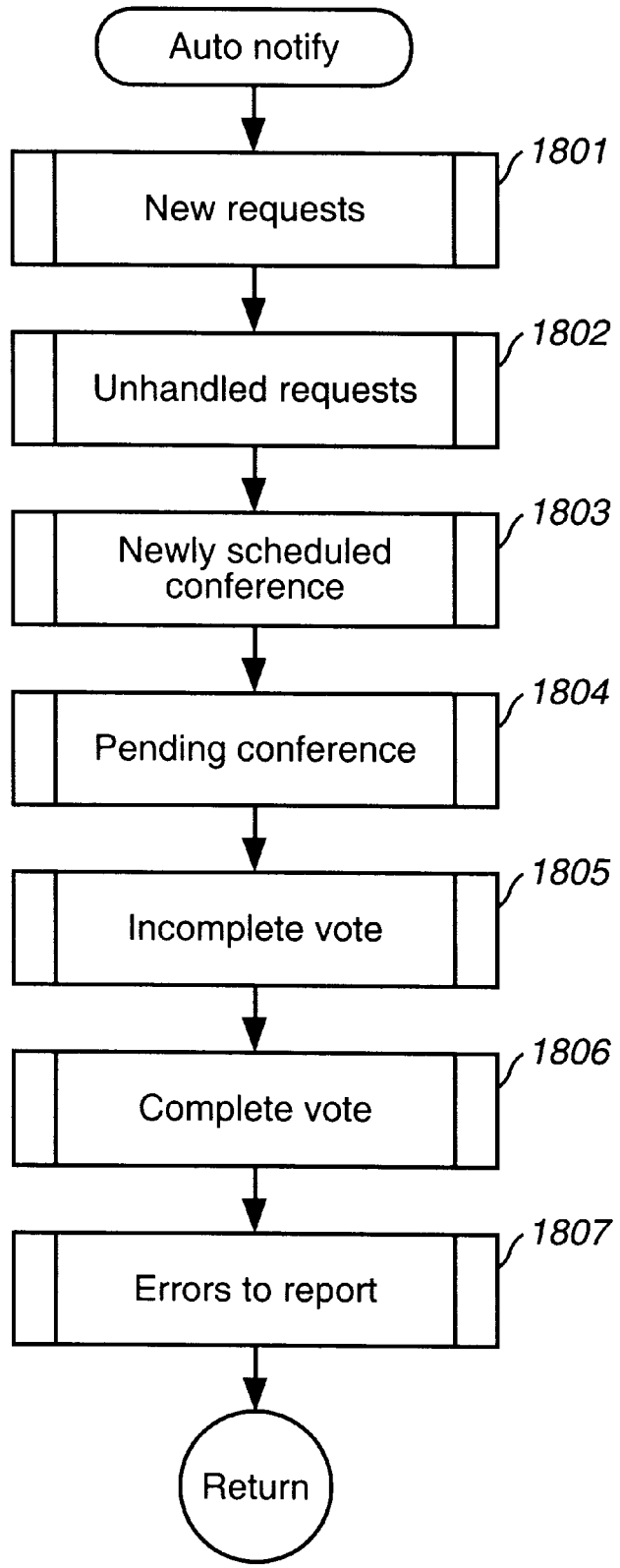
FIG. 18 displays a high-level flow control diagram for the Auto-Notification process.

FIG. 18 displays a high-level flow control diagram for the Auto-Notification process. In step 1801, Auto-Notification detects new standard change requests or exception requests entered by users of the automated ITSMS. The AutoNotification process sends an e-mail message to the owner of the standard informing the owner of the proposed change or exception request. In step 1802, the Auto-Notification process detects any pending standard change requests or exception requests that are nearing or have reached the date by which the requests were to be either fulfilled or denied. The Auto-Notification process then sends an e-mail message to each owner of an unhandled request, reminding the owner of the necessity to resolve the unhandled request. In step 1803, the Auto-Notification process detects any newly scheduled conferences entered into the local standards database and sends an e-mail message to each user required to attend the conference, informing that user of the time, date, expected duration, and topic for the conference. In step 1804, the Auto-Notification process detects any conferences that are scheduled to occur prior to the next time that the Auto-Notification process runs and sends e-mail to each attendee of the conference informing the attendee that the conference is about to begin. In step 1805, the Auto-Notification process detects proposed standard changes or exception requests that have been submitted to a vote by the committee members responsible for the standard, but for which all the votes have not been entered by users of the automated ITSMS. The Auto-Notification process sends e-mail to those committee members that have not voted, informing them of the necessity to submit their votes. In step 1806, the Auto-Notification process detects proposed standards change requests and exception requests that have been submitted for votes and for which all the votes have been entered into the system. The Auto-Notification process sends e-mail to the user that requested the standards change or exception, informing the user of the outcome of the vote. The Auto-Notification process may additionally delete the references to the request and remove the voting records or may mark the references and voting records for later destruction by the automated ITSMS. In step 1807, the Auto-Notification process detects any errors that have been recorded in the local standards database by the JCL prep process and sends e-mail to the users who submitted programs for execution that caused those errors, informing the users of the standard that has been violated and offering the users a chance to submit a standards change request or exception request to overcome the error condition. The Auto-Notification process is run on a regular basis by the automated ITSMS. It may be run, for instance, on an hourly basis. Alternately, the Auto-Notification process may be run each time a substantive change is made to the local standards database by the Web Server process. In either case, the Auto-Notification process generally handles events and conditions that have arisen since the last time that the Auto-notification process was run, and either removes or marks for destruction those events and conditions in the local standards database that have been successfully handled by users of the automated ITSMS.

Figure 19:
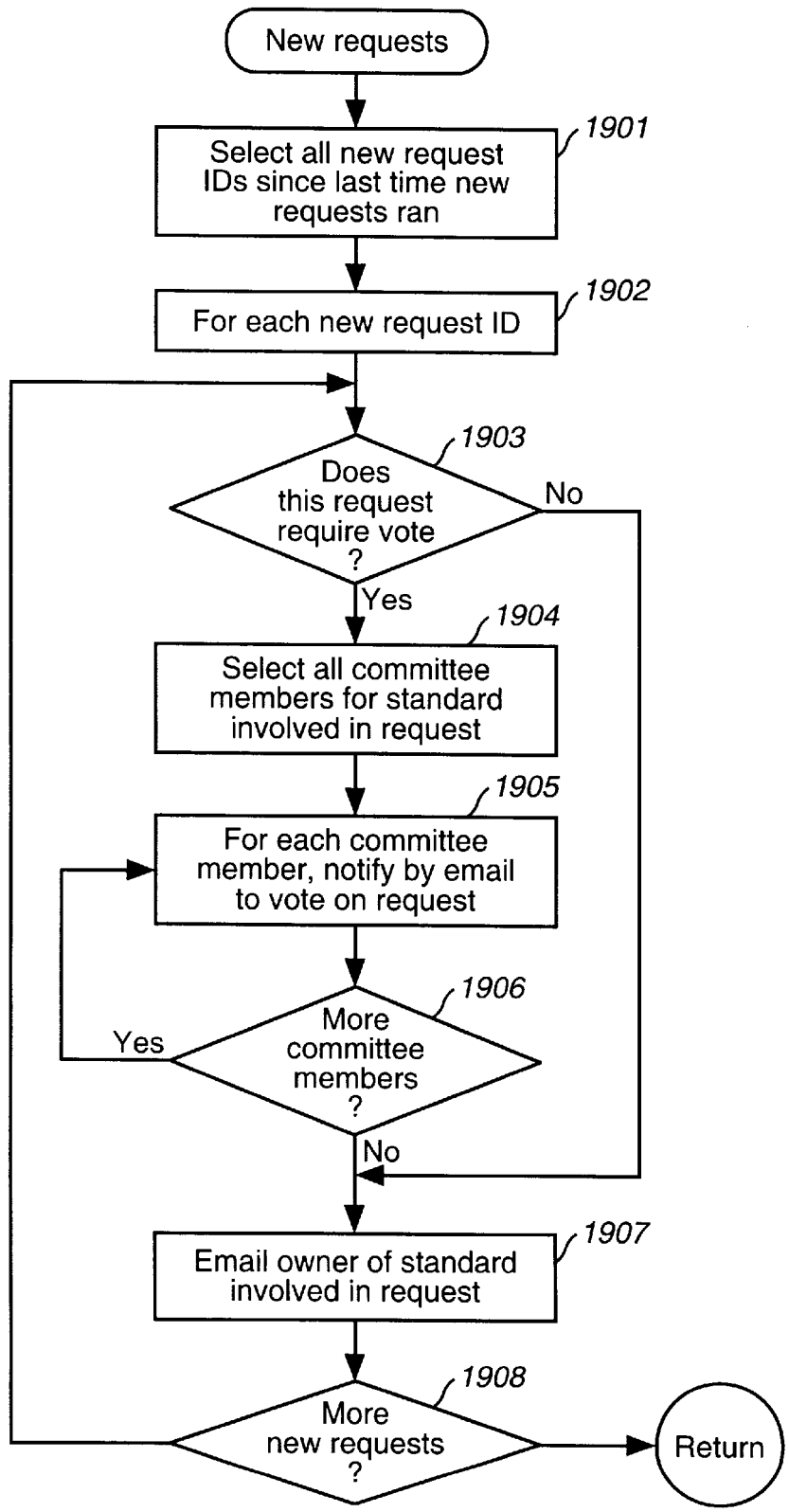
FIG. 19 displays a flow control diagram for the subroutine "New Requests" of step 1801 of FIG. 18.

FIG. 19 displays a flow control diagram for the subroutine "New Requests" of step 1801 of FIG. 18. There are many different possible ways that new requests might be handled by the Auto-Notification process. The implementation of New Requests, displayed in FIG. 19, illustrates one of the many different possible alternatives. In step 1901, New Requests selects all the new request IDs that have been entered into the local standards database since the last time that New Requests was run. Assuming that new requests are entered into the local standards database by the Web Server process with a status equal to 'E,' then the desired request IDs may be selected using the following SQL-like statement:

Select request ID from Change Requests where Status='E '

Steps 1902–1908 together comprise a loop that is executed for each request ID selected in step 1901. In step 1903, New Requests determines whether the selected request ID designates a change request that requires a vote. Assuming that the Web Server process enters into the Votes table entries that designate required votes for a particular request, each entry having a NULL value in the vote column indicting that the corresponding vote has not yet been received, then New Requests can determine whether the selected request ID requires a vote by executing the following SQL-like command and noting whether the executed command returns a value greater than 0:

Select count (*) from Votes where request ID=<selected request ID>

If the sequel statement returns a value greater than 0, then a vote is required for the selected request, and control flows to step 1904. Otherwise, control flows to step 1907. In step 1904, New Requests selects all committee members that are required to vote on the request. New Requests can select the user IDs for these committee members by executing the following SQL-like statement:

Select user ID from Votes where request ID=

<selected request ID>and vote is NULL

In step 1905, New Requests determines the e-mail address corresponding to each of the selected user IDs in step 1904, and e-mails to the determined e-mail addresses a notice that a vote is required on the proposed standards change or exception request. The e-mail addresses may be selected by the following SQL-like statement:

Select e-mail from Users where user ID=<selected user ID>

The details about the request, to be included in the e-mail message, may be obtained by New Requests by executing the following SQL-like statement:

Select * from Change Requests where request ID=<selected request ID>

In step 1906, New Requests determines whether there are more committee members to notify and, if so, control flows back to step 1905, otherwise, control flows to step 1907. In step 1907, New Requests determines the e-mail address of the owner of the standard and sends to that owner an e-mail message indicating that a request has been made. The e-mail address for the owner can be obtained by New Requests by executing the following SQL-like statement:

Select e-mail from Users where user ID=(Select owner from Owners where standard=(Select standard from Change Requests where request ID=<selected request ID>))

The information about the proposed standard change or exception requests may be obtained by New Requests in the same fashion as it is obtained above in order to send the vote notification e-mail to committee members in step 1905. If more new requests have been selected in step 1901 and need to be handled by New Requests, then control flows from step 1908 back to step 1903. Otherwise New Requests returns.

Figure 20:
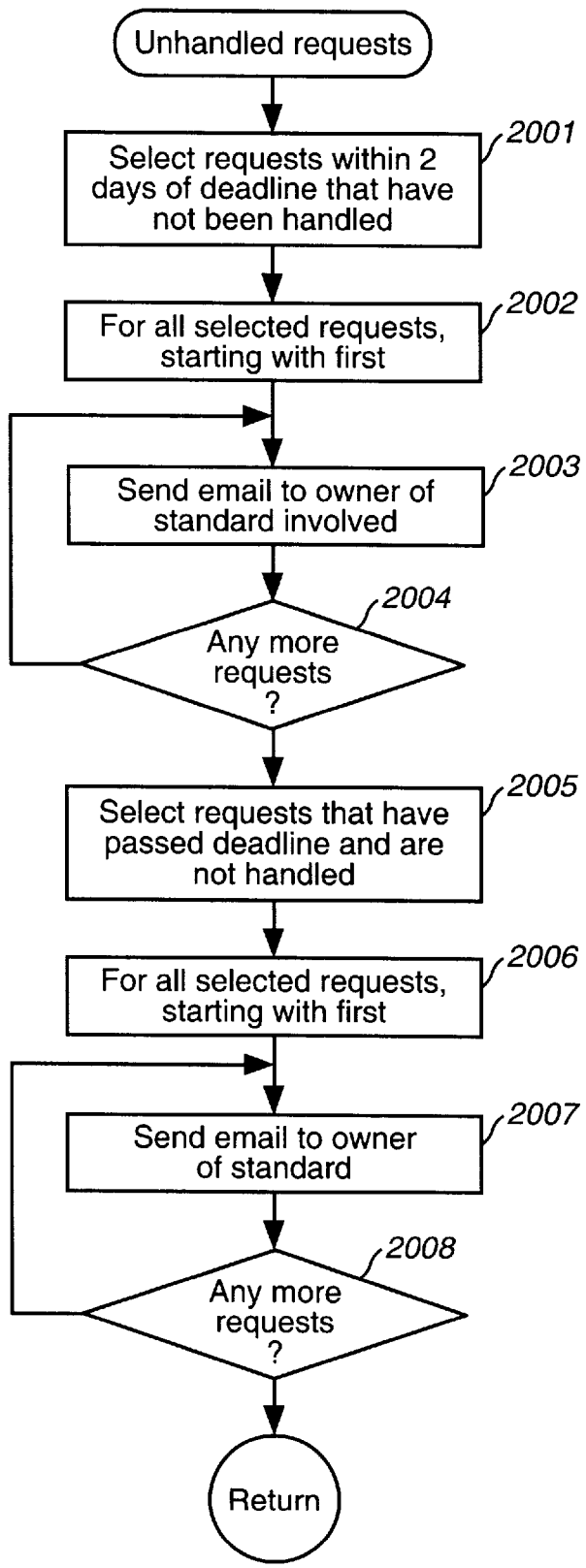
FIG. 20 displays the subroutine "Unhandled Requests" called in step 1802 of FIG. 18.

FIG. 20 displays the subroutine "Unhandled Requests" called in step 1802 of FIG. 18. In step 2001, Unhandled Requests selects those requests that are within two days of the deadline for being handled and that have not yet been handled by the automated ITSMS. Unhandled Requests can obtain the request IDs for all such requests by executing the following SQL-like statement:

Select request ID from Change Requests where Status=

'0' and days_between (close date, date)≦2

This assumes that a value 'O' in the status field of a change request record indicates that the request is pending or open. In step 2002, Unhandled Requests loops through each of the selected request IDs from step 2001. For each of the selected request IDs, Unhandled Requests sends e-mail to the owner of the standard involved, reminding the owner that the selected request has been proposed and that only two days remain for the request to be either fulfilled or denied. The e-mail address of the owner and the relevant information about the request may be determined as discussed above in the New Requests subroutine. In analogous fashion, in steps 2005–2008, Unhandled Requests detects any proposed standards change requests or exception requests that have passed the deadline for being handled and have not yet been handled. The owner of each such detected unhandled request is notified by e-mail in step 2007. The SQL-like statement used to select such requests in step 2005 is:

Select request ID from Change Requests where status='0' and close date ≦date

Figure 21:
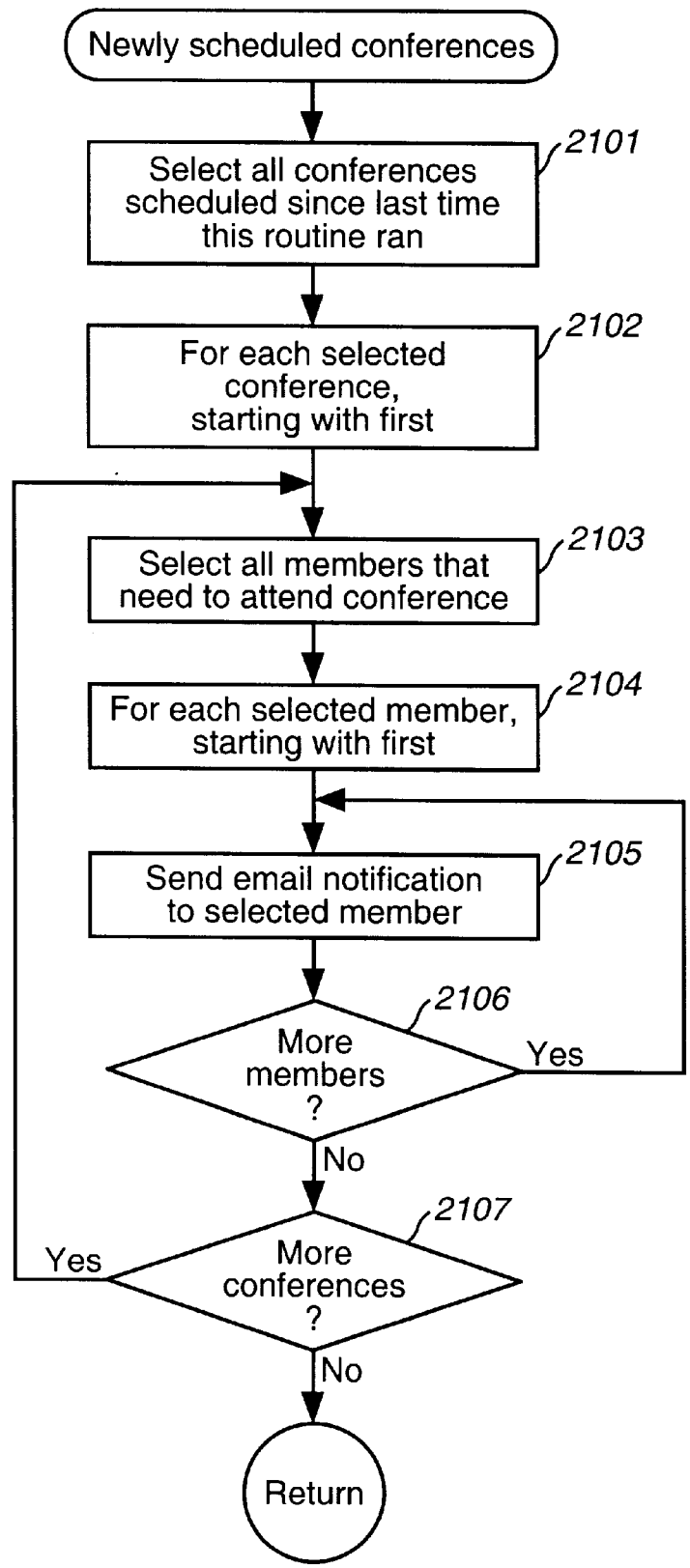
FIG. 21 displays a flow control diagram for the subroutine "Newly Scheduled Conference" called in step 1803 of FIG. 18.

FIG. 21 displays a flow control diagram for the subroutine "Newly Scheduled Conference" called in step 1803 of FIG. 18. In step 2101, Newly Scheduled Conferences selects all conferences that have been entered into the local standards database since the last time that Newly Scheduled Conferences ran. Assuming that the Web Server process enters new conferences into the local standards database with a status of "E," then Newly Scheduled Conferences can select the conference ID of all such conferences with the following SQL-like statement:

Select conference ID from Conferences where status='E'

Steps 2102–2107 represent a loop through each of the selected conference IDs. In step 2103, Newly Scheduled Conferences selects the user IDs of all members that need to attend the conference. Newly Scheduled Conferences can select these user IDs by executing the following SQL statement:

Select user ID from Conference Attendees where conference ID=<selected conference ID>

For each such selected user ID, Newly Scheduled Conferences executes a single iteration of the loop formed by steps 2104–2106. For each selected user, Newly Scheduled Conferences sends an e-mail to the user notifying the selected user of the fact that the conference has been scheduled. E-mail addresses for the user may be selected in a manner analogous to the manner in which e-mail addresses are selected above, in step 1905 of the subroutine New Requests. Details about a conference may be obtained by Newly Scheduled Conferences by executing the following SQL-like statement:

Select * from Conferences where conference ID=<selected conference ID>

This information about the conference is, of course, included by Newly Scheduled Conferences in each e-mail message to each selected user.

Figure 22:
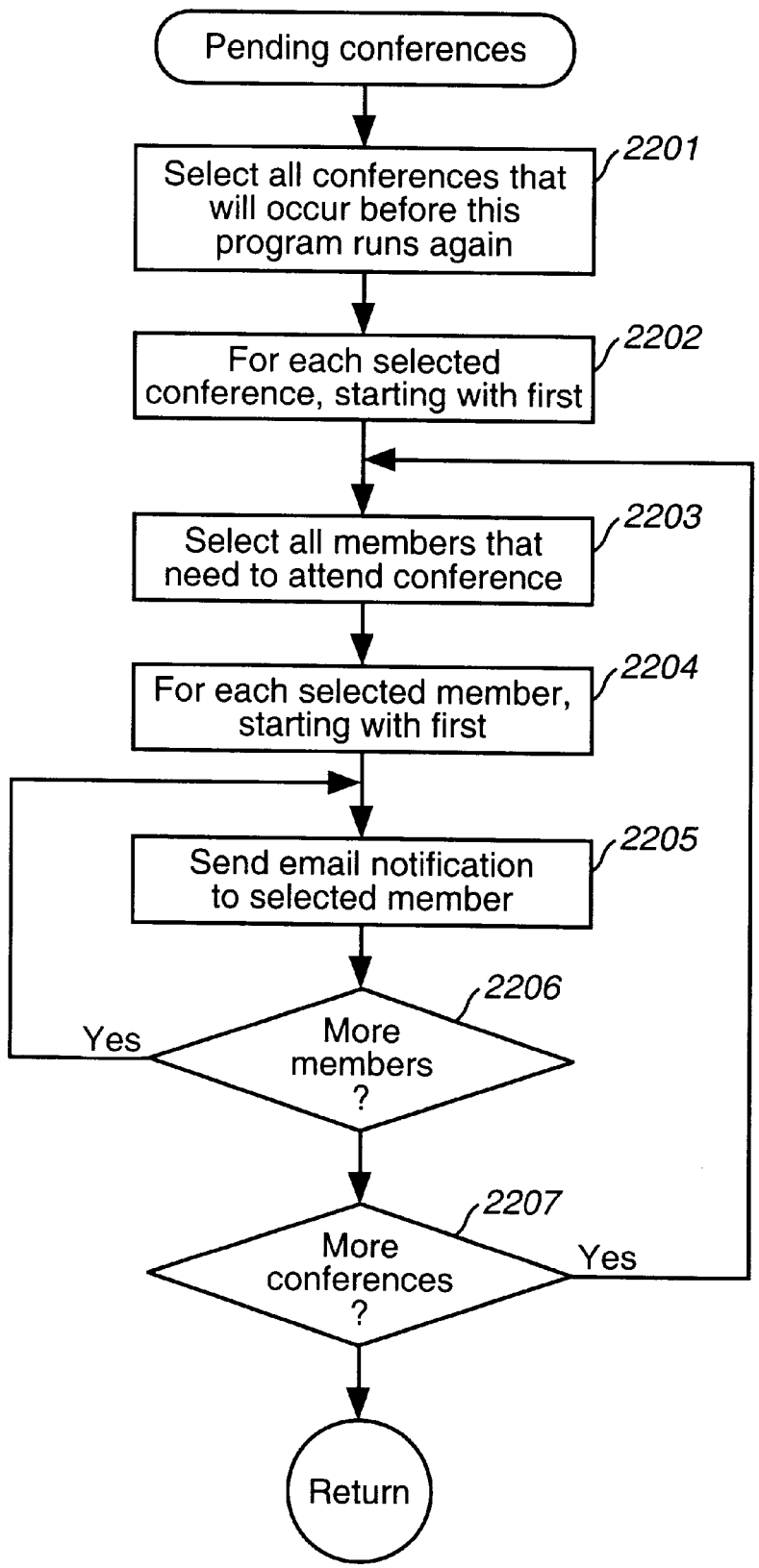
FIG. 22 displays a flow control diagram for the Pending Conferences subroutine called in step 1804 of FIG. 18.

FIG. 22 displays a flow control diagram for the Pending Conferences subroutine called in step 1804 of FIG. 18. In step 2201, Pending Conferences selects all conferences that will occur before the Auto-Notification process is to again be run by the automated ITSMS. Alternately, Pending Conferences may select all conferences that will occur within a fixed time interval from the current time, like, for example, within the next hour. In the latter case, Pending Conferences can select the conference IDs of all such conferences by executing the following SQL-like statement:

Select conference ID from Conferences where minutes$_{13}$between (start, current time) <60

For each of these selected conferences, Pending Conferences executes one iteration of the loop comprising steps 2202–2206. In this loop, Pending Conferences sends an e-mail message to each member required to attend the conference, notifying the member that the conference is about to begin. E-mail addresses and details about the conference can be obtained by Pending Conferences analogously to the manner in which they were obtained in the subroutine Newly Scheduled Conferences.

Figure 23:
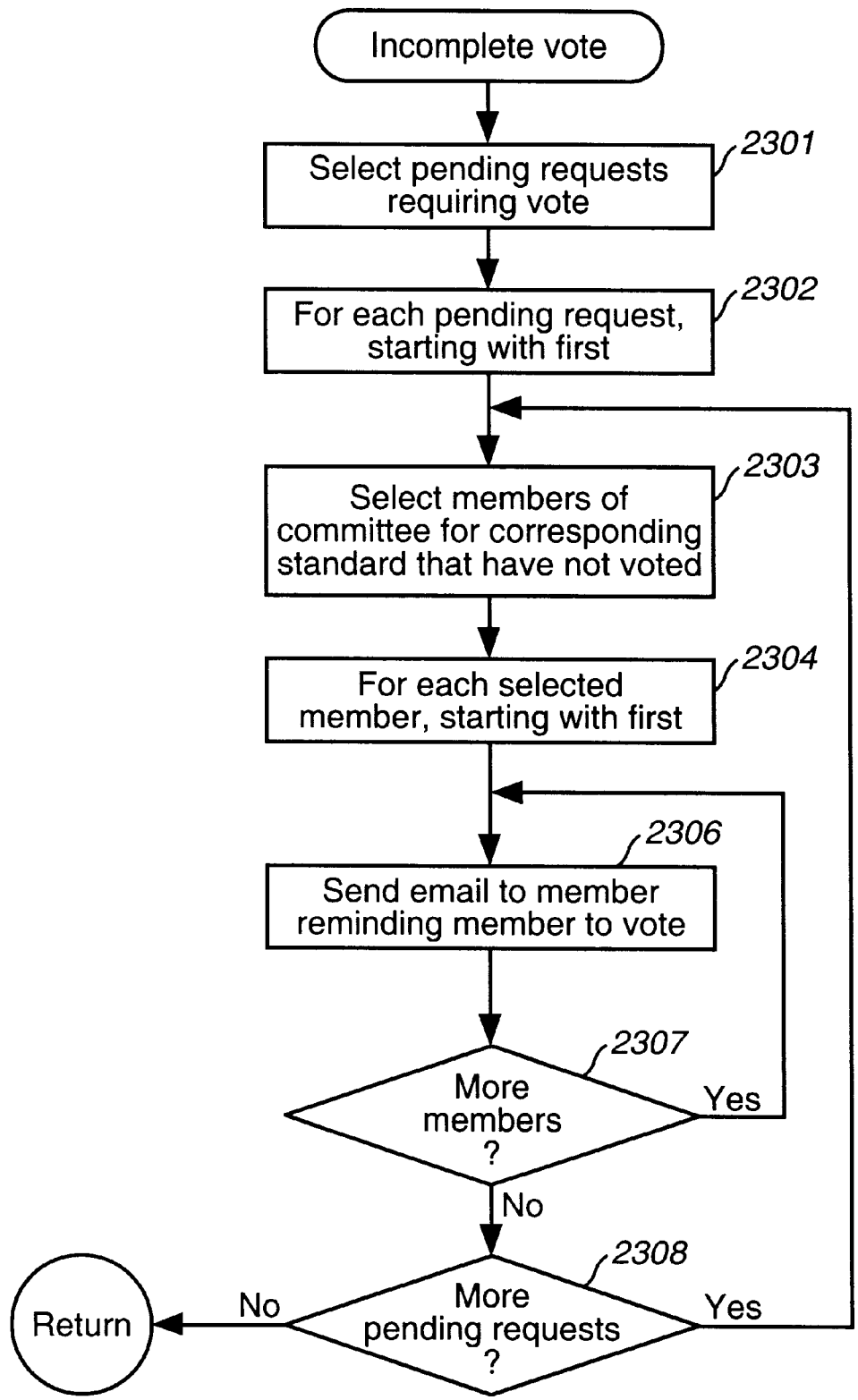
FIG. 23 displays a flow control diagram for the subroutine Incomplete Vote called in step 1805 of FIG. 18.

FIG. 23 displays a flow control diagram for the subroutine Incomplete Vote called in step 1805 of FIG. 18. In step 2301, Incomplete Vote selects the request IDs of all pending requests that still require votes. Incomplete Vote may obtain the request IDs of such requests by executing the following SQL-like statement:

Select request ID from Change Requests where status='O' and request ID in (select request ID from votes where vote=NULL)

In steps 2302–2308, Incomplete Vote determines for each such selected pending request which members have not voted, and sends e-mail to those members reminding them of their need to vote on the request. The members that have not voted for the request may be obtained by Incomplete Vote by executing the following SQL-like statement:

Request user ID from Votes where request ID=<selected request ID> and vote=NULL

For all such non-voting members, Incomplete Vote sends an e-mail message reminding the non-voting member to vote in the inner loop comprising steps 2304–2307.

Figure 24:
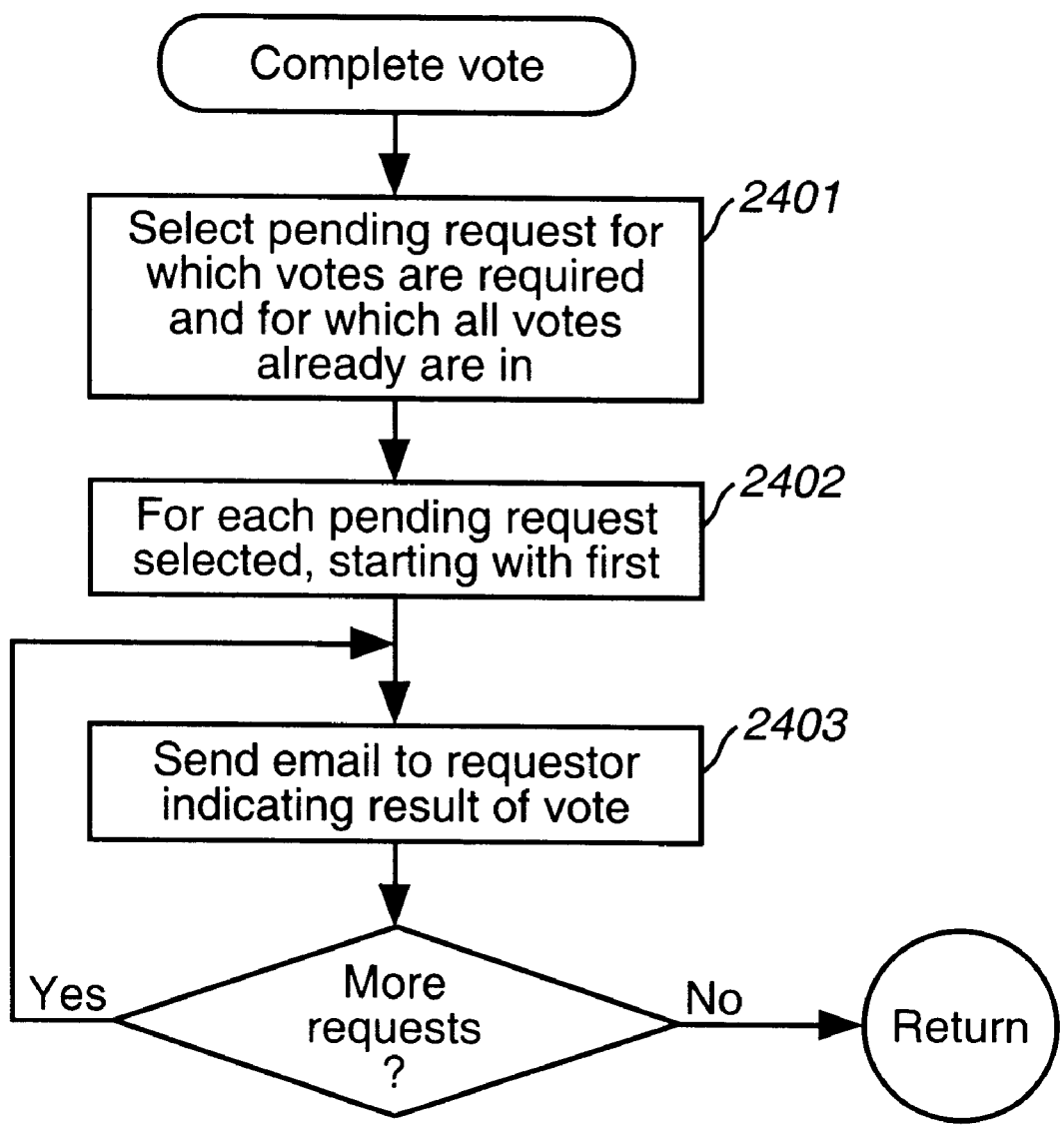
FIG. 24 displays a flow control diagram for the subroutine Complete Vote called in step 1906 of FIG. 19.

FIG. 24 displays a flow control diagram for the subroutine Complete Vote called in step 1906 of FIG. 19. In step 2401, Complete Vote selects all pending requests for which all the votes have been submitted. Complete Vote may obtain the request IDs for such requests by executing the following SQL-like statement:

Select request ID from Change Requests where status='0'and request ID not in (select request ID from Votes where vote= NULL)

For each such selected request, Complete Vote, in step 2402, sends an e-mail message to the owner of the standard corresponding to the request indicating to the owner of the standard the outcome of the vote. The outcome of the vote for any particular request may be easily determined using aggregate operators to determine the number of votes cast for the proposed request and the number of votes cast against the proposed request. For example, the number of for votes cast for a particular request can be obtained by Complete Votes by executing the following SQL-like statement:

Select count (*) from Votes where request ID=

<selected request ID>and vote='Y'

Complete Votes can total the number of votes cast for the proposal and the number of votes cast against the proposal and make a determination based on those numbers of whether the proposal has sufficient yes votes to have been deemed accepted. In step 2403, Complete Vote sends an e-mail to the user that requested the standards change or exception in order to notify that user of the outcome of the vote. The e-mail address for the user that requested the change or exception can be obtained by Complete Vote by executing the following SQL-like statement:

Select e-mail from Users where user ID=(select submitter ID from Change Requests where request ID=<selected request ID>)

Figure 25:
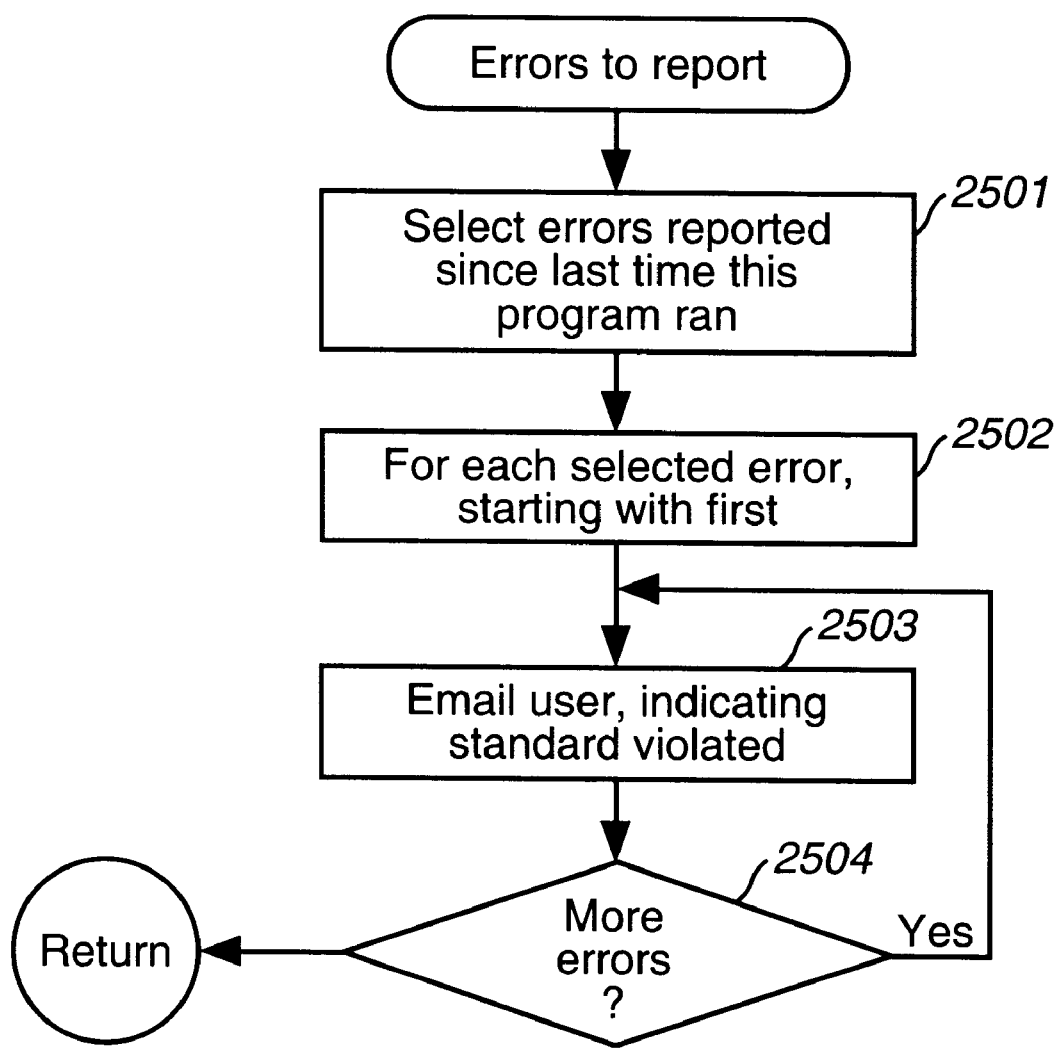
FIG. 25 displays a flow control diagram for the subroutine "Errors To Report" called in step 1807 of FIG. 18.

FIG. 25 displays a flow control diagram for the subroutine "Errors To Report" called in step 1807 of FIG. 18. Assuming that the Errors table is cleared following each execution of the Auto-Notification process, Errors To Report simply selects each record from the Errors table in step 2501. Errors To Report then executes, for each of the selected errors, the loop comprising steps 2502–2504. For each of the selected errors, Errors To Report prepares an e-mail to the user whose submitted program encountered the error and indicating to the user the standard that was violated, offering to the user various options, including submitting a standard change request or an exception request. The e-mail address for the users can be obtained by Errors To Report in an analogous fashion to the manner in which e-mail addresses are obtained in the above-discussed subroutines. Information about the standard that was violated, to be included in the e-mail message, may be obtained by Errors To Report by executing the following SQL-like statement:

Select * from Standards where JCL error=<selected JCL error>

When e-mail messages have been sent to each user of each entry in the Errors table the subroutine Errors To Report returns.

Figure 26:
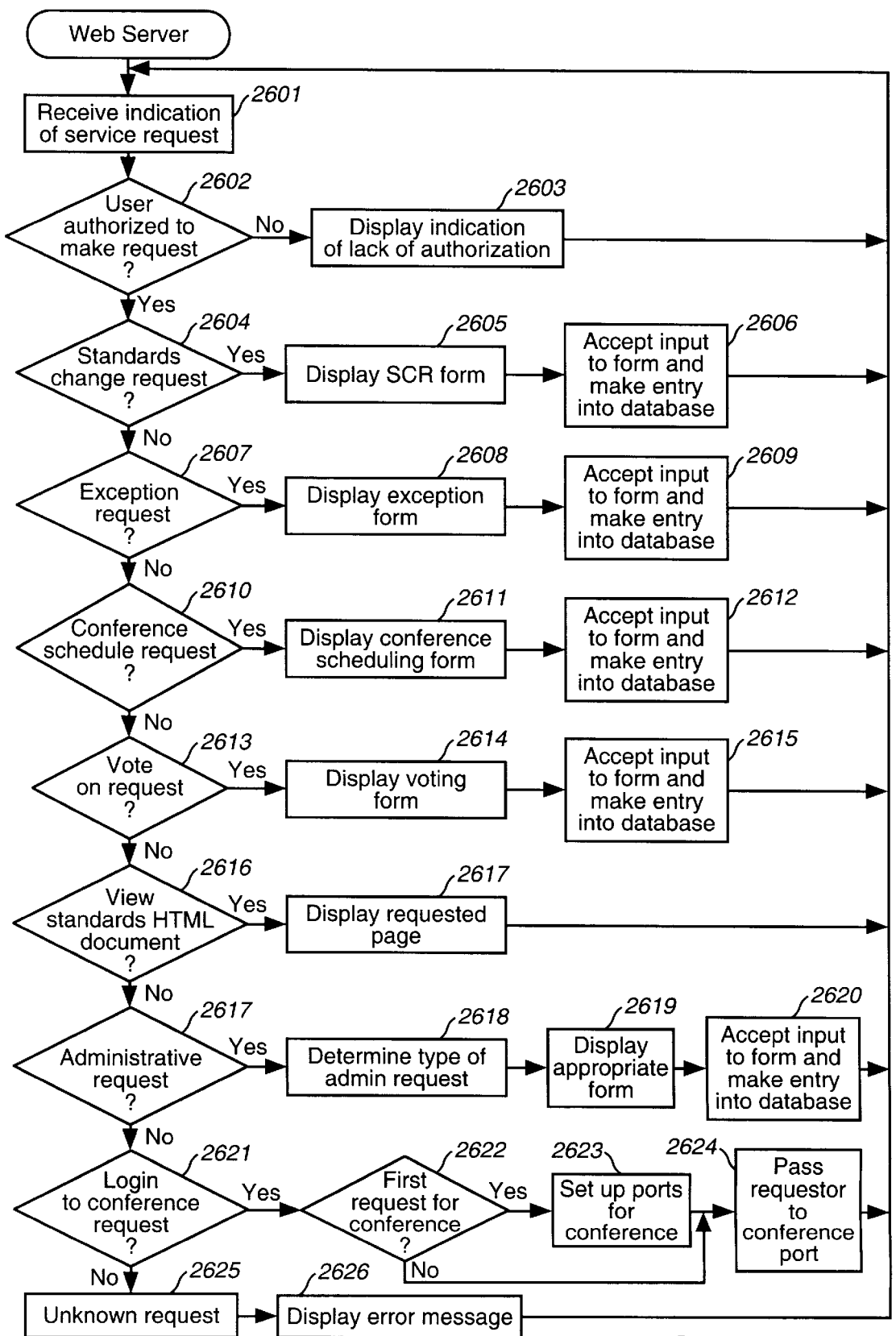
FIG. 26 displays a flow control diagram for the Web Server process.

FIG. 26 displays a flow control diagram for the Web Server process. In step 2601, the Web Server process receives from a user an indication of the type of service that the user is requesting from the Web Server process. In step 2602, the Web Server process compares the user ID of the user requesting a service with a table listing the authorizations for services for each user to determine whether the user making the service request is authorized to make the service request. If the user is not so authorized, then the Web Server process displays to the user an indication of the lack of authorization and inability to provide the service in step 2603 and control flows back to step 2601 where the Web Server again receives an indication of a service request from either the same user or another user. If the user was authorized to make the request, then the Web Server process handles the request in the remaining steps shown in FIG. 26. In step 2604, the Web Server process determines whether the request was for a standards change. If so, then in step 2605, the Web Server displays the standards change request form to the user and, in step 2606, accepts input to the form and uses that input to enter a change request entry into the Change Requests table with a status of 'E'to indicate that the change request has not yet been handled by the Auto-Notification process. If the requested service was for an exception, as detected by the Web Server process in step 2607, then, in step 2608, the Web Server process displays an exception request form to the user and, in step 2609, accepts input to the form from the user and makes an entry into the Change Requests table for the new exception request. If the user requested the scheduling of a conference, as detected by the Web Server process in step 2610, then the Web Server process, in step 2611, displays a conference scheduling form to the user and, in step 2612, receives input to this form from the user and enters the scheduling request into the Conferences table with a status of "E" to indicate that Auto-Notification has not yet handled this newly-requested conference. If the user is submitting a vote on a proposed request, as detected by the Web Server in step 2613, then the Web Server, in step 2614, displays a vote submission form to the user and, in step 2615, accepts input from the user and updates the Votes table to enter the vote. The vote column for the row containing the vote is updated from being NULL to being either 'Y' or 'N,' indicating a yes or a no vote, respectively. If the user is making a request to view the HTML standards document, as detected by the Web Server process in step 2616, then the Web Server process displays the requested page of the HTML standards document in step 2617. The user may explicitly request a page, or implicitly request a page by activating a hyperlink within the HTML page currently displayed to the user. If the user is requesting some kind of administrative service, as determined by the Web Server process in step 2617, then, in step 2618, the Web Server process determines the nature of the administrative request in step 2619, displays the appropriate HTML interface form for that request, and, in step 2620, accepts input to the displayed form and executes the administrative request. Administrative requests include adding users to the User Table, adding standards to the Standards table, and updating entries in other tables in order to effect a change to the contents of the local standards database. If the user is requesting a log-in to a conference, as detected by the Web Server process in step 2621, then the Web Server process determines whether this is the first user logging into the conference, in step 2622, and, if so, initializes the logical port for the conference in step 2623, and finally, in step 2624, connects the user to the logical port for the conference so that the user can communicate with other conference attendees. Finally, if the Web Server process does not recognize the service request, in step 2625, the Web Server process displays an appropriate error message in step 2626 and returns to step 2601.

The Web Server process thus serves as the data collection engine and data update engine for the automated ITSMS. There are many possible ways in which to divide tasks between the Web Server process and the other processes running on the mini computer. In the preferred embodiment discussed above, the Web Server process must update entries in the local standards database tables following each execution of the Auto-Notification process to indicate that the Auto-Notification process has considered those entries. For example, change request entries with a status of 'E' must be updated to have a status of 'O' by the Web Server process following execution of the Auto-Notification process. Alternately, the Auto-Notification process itself could update the database.

Although the present invention has been described in terms of the preferred embodiment, it is not intended that the invention be limited to this embodiment. Modification within the spirit of the invention will be apparent to those skilled in the art. For example, a wide variety of different data organizations within the Local Standard Database can be used to store data collected by the Web Server process that is eventually re-incorporated into the standards dataset on the centralized computer system. Different number of relational tables may be employed, different numbers of columns within the relational tables can be employed, and even a different type of database, other than a relational database, can be used. In addition to disseminating standards information over a corporate intranet the automated ITSMS could also disseminate that information over the Internet, or possibly by other broadcast transmission medium. Almost any type of text-based document is amenable to dissemination and management by the automated ITSMS. The automated ITSMS could thus be used as a general document manager. Various alternate hardware configurations could be employed. For example, a PC-server could be substituted for the network server that runs the Web Server and Auto-Notification processes. The scope of the present invention is defined by the claims which follow.

What is claimed is:

1. In an automated information technology standards management system, a method for converting a text-based standards document stored in a flat file format into a hypertext markup language standards document, the text-based standards document including sections with section headings, the text-based standards document having references to the sections within the text-based standards document and having references to external documents, the method comprising:

identifying references to external documents in the text-based standards document and replacing these references with hyperlinks to the external documents in the hypertext markup language standards document by creating a new hypertext markup language standards document and a temporary index wherein for each line of the text-based standards document, reading the line into memory and changing references to external documents in the line into hyperlinks to the external documents, identifying line references to sections within the text-based standards document and marking the lines for further processing and changing for each line marked for further processing into a hyperlink to the corresponding section within the hypertext markup language standards document by using the temporary index to determine which line of the hypertext markup language standards document includes the heading for that section and initializing the hyperlink to reference the determined line and replacing these references in the hypertext markup language standards document with hyperlinks to the corresponding sections in the hypertext markup language standards document;

inserting hyperlinks to hypertext markup language interface documents into the hypertext markup language standards document, following section headings that allow a reader of the hypertext markup language standards document to easily request management services related to the sections by changing the section headings and indications in the temporary index into hyperlinks to the section headings within the hypertext markup language standards document and appending the temporary index to the hypertext markup language standards document.; and appending to the hypertext markup language standards document an index of hyperlinks to the various sections within the hypertext markup language standards document.

2. A computer-readable medium containing computer-executable instructions for an automated information technology standards management system to convert a text-based standards document stored in a flat file format into a hypertext markup language standards document, the text-based standards document including sections with section headings, the text-based standards document having references to the sections within the text-based standards document and having references to external documents, by:

identifying references to external documents in the text-based standards document and replacing these references with hyperlinks to the external documents in the hypertext markup language standards document by creating a new hypertext markup language standards document and a temporary index wherein for each line of the textbased standards document, reading the line into memory and changing references to external documents in the line into hyperlinks to the external documents, identifying line references to sections within the text-based standards document and marking the lines for further processing and changing for each line marked for further processing into a hyperlink to the corresponding section within the hypertext markup language standards document by using the temporary index to determine which line of the hypertext markup language standards document includes the heading for that section and initializing the hyperlink to reference the determined line and replacing these references in the hypertext markup language standards document with hyperlinks to the corresponding sections in the hypertext markup language standards document;

inserting hyperlinks to hypertext markup language interface documents into the hypertext markup language standards document, following section headings that allow a reader of the hypertext markup language standards document to easily request management services related to the sections by changing the section headings and indications in the temporary index into hyperlinks to the section headings within the hypertext markup language standards document and appending the temporary index to the hypertext markup language standards document.; and appending to the hypertext markup language standards document an index of hyperlinks to the various sections within the hypertext markup language standards document.

3. The computer-readable medium of claim 2, further including an auto-notification process that monitors the local standards database to detect events requiring notification of a number of users and sends email messages to the users that require notification of each detected event.

4. The computer-readable medium of claim 3 wherein events requiring notification of a number of users include requests for exceptions to information technology standards.

* * * * *